3,825,566
A-NOR-3-THIA CORTICOIDS
Christopher M. Cimarusti, Hamilton, Frederick F. Giarrusso, Belle Mead, and Seymour D. Levine, North Brunswick, N.J., assignors to E. R. Squibb & Sons, Inc., Princeton, N.J.
No Drawing. Filed Feb. 15, 1973, Ser. No. 332,984
Int. Cl. A61k 27/00; C07d 63/04
U.S. Cl. 260—332.3 P                                       18 Claims

ABSTRACT OF THE DISCLOSURE

Novel A-nor-3-thia steroids, having utility as anti-inflammatory agents, are disclosed.

SUMMARY OF THE INVENTION

Novel A-nor-3-thia steroids having the formula:

(I)

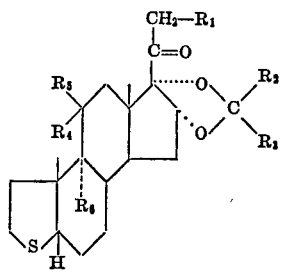

and the sulfones of A-nor-3-thia steroids having the formula:

(II)

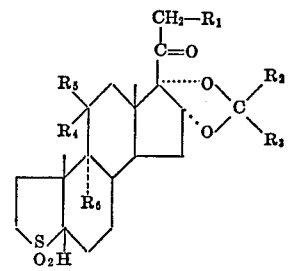

have been found to be anti-inflammatory agents. In formulas I and II, and throughout the specification, the symbols have the following meanings:

$R_1$ may be hydrogen, hydroxy, acetoxy, or halo;
$R_2$ may be hydrogen, lower alkyl, or aryl;
$R_3$ may be lower alkyl or aryl;
$R_4$ may be hydrogen, or hydroxy, and $R_5$ may be hydrogen, or $R_4$ and $R_5$ may together be keto;
$R_6$ may be hydrogen or halo.

DETAILED DESCRIPTION OF THE INVENTION

The steroids of formula I, and the corresponding sulfones of formula II, and physiologicaly active substances that possess glucocorticoid and anti-inflammatory activity. They can be used topically in lieu of known glucocorticoids in the treatment of skin conditions such as dermatitis, sunburn, neurodermatitis, eczema, and anogenital pruritis. The compounds of this invention may be used in the range of 0.01 to 5.0% by weight, preferably 0.05 to 2.0% by weight, in a conventional cream or lotion.

The expression "lower alkyl" refers to straight and branched chain hydrocarbon groups having from 1 to 7 carbon atoms, e.g., methyl, ethyl, propyl, isopropyl, t-butyl, heptyl, etc.

The expression "aryl" refers to monocarbocyclic aromatic groups that may either be unsubstituted or substituted with halogen, lower alkoxy (i.e. $R_{10}$—O— wherein $R_{10}$ is lower alkyl) or lower alkyl, e.g. phenyl, ethoxyphenyl, propylphenyl, chlorophenyl, tolyl, etc.

The halogens contemplated for use in this invention are F, Cl, Br, and I.

The starting materials which may be used to synthesize the novel compounds of this invention are:

(III)

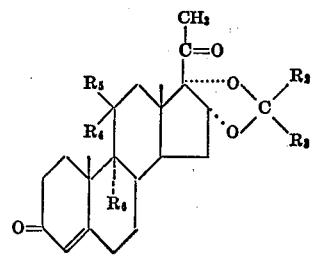

and (IV)

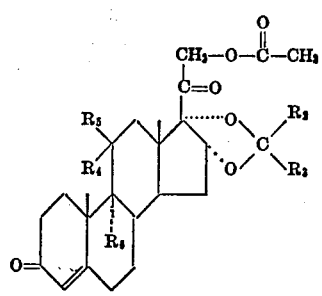

The steroids of formulas III and IV are known; see, for example, U.S. Pat. No. 3,048,581 to Josef Fried.

The syntheses of the steroids of formulas I and II, wherein $R_1$ is hydrogen, utilize starting materials of formula III.

The starting material of formula III is converted by catalytic hydrogenation to a 5β-steroid having the following structure:

(V)

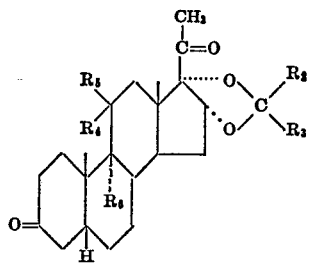

Oxidation of the steroid of formula V with a strong oxidizing agent, e.g., chromium trioxide, yields a dicarboxylic acid having the following structure:

(VI)

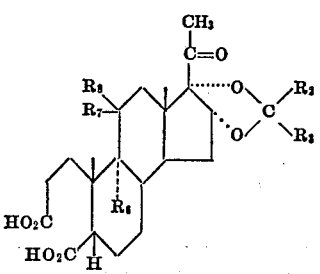

In formula VI, and throughout the specification, $R_7$ and $R_8$ are each hydrogen or together are keto. If the starting material of formula III has a hydroxyl group in either the 11α- or 11β-position, it will be converted to a keto group during the oxidation step. The oxidation step is carried out by adding the oxidizing agent to a solution of the compound of formula V in a polar organic solvent, e.g., acetic acid, and stirring the solution at a temperature of from about 10° C. to 50° C., preferably about 20° C., for about 2 hours to 24 hours, preferably for about 4 hours to 6 hours.

The steroid of formula VI is subjected to a Hunsdiecker reaction to yield a mixture of epimeric dibromo steroids of the following structure:

(VII)
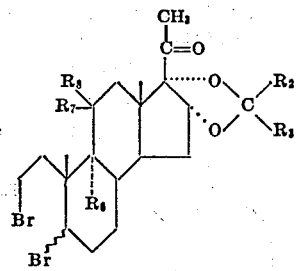

The final step in the formation of one of the novel A-nor-3-thia steroids of this invention is the displacement of the bromine atoms of the steroid of formula VII with sulfur. The reaction is carried out in an inert atmosphere by adding dropwise, a solution of the compound of formula VII in an organic solvent, e.g., ethanol, to a solution of sodium sulfide in the same solvent which has been heated to reflux. The reaction mixture is refluxed for about 1 hour to 24 hours, preferably about 12 hours. The resulting A-nor-3-thia steroid has the structure:

(VIII)
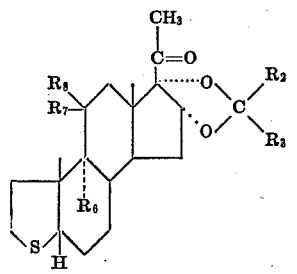

The syntheses of the steroids of formulas I and II wherein $R_1$ is hydroxy, acetoxy, or halo utilize starting materials of formula IV.

The 21-acetoxy steroid of formula IV is treated as described above (hydrogenated, oxidized, subjected to a Hunsdiecker reaction, and reacted with sodium sulfide) to form a 21-hydroxy steroid having the structure:

(IX)
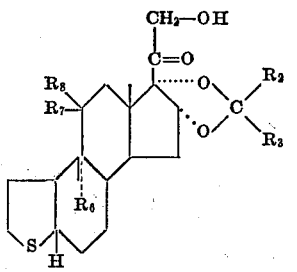

If the starting material of formula IV is unsubstituted in the 11-position, $R_7$ and $R_8$ will be hydrogen. If, however, the starting material is substituted with a hydroxyl group or a keto group in the 11-position, $R_7$ and $R_8$ will together be a keto group. Regardless of what substituent the starting material of formula IV has in the 11-position, the acetoxy group in the 21-position of the starting material is hydrolyzed off during the cyclization step.

To obtain a steroid of formula I wherein $R_1$ is acetoxy and wherein the 11-position is either unsubstituted or substituted with a keto group, the steroid of formula IX is treated with actic anhydride to obtain a 21-acetoxy steroid having the following structure:

(X)
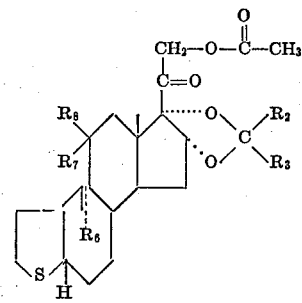

To obtain a steroid of formula I wherein $R_1$ is halo and wherein the 11-position is either unsubstituted or substituted with a keto group, the steroid of formula IX is reacted with a sulfonyl chloride having the formula

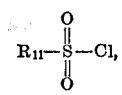

wherein $R_{11}$ may be lower alkyl or aryl, to obtain a 21-sulfonate steroid of the following structure:

(XI)
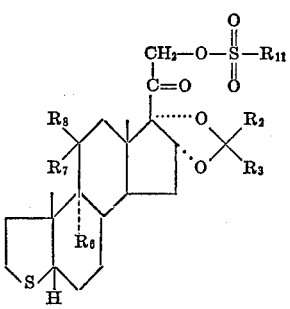

The 21-sulfonate steroid of formula XI may be reacted with an inorganic halide to obtain a compound of the following structure:

(XII)
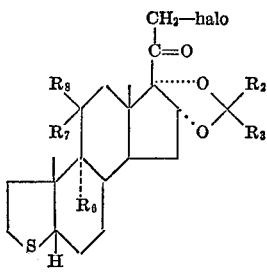

LiCl is exemplary of the inorganic halides that may be used to obtain a 21-halo steroid of formula XII. Other appropriate inorganic halides include lithium bromide and sodium iodide.

To obtain a steroid of the structure:

(XIII)
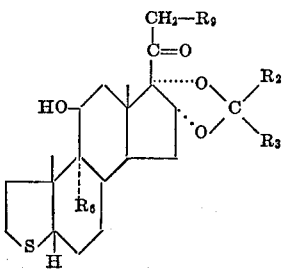

a steroid having the following structure:

(XIV)

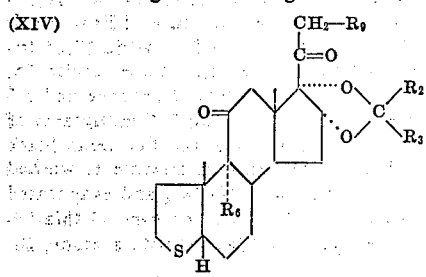

is first prepared as described above. The formulas XIII and XIV, and throughout the specification, $R_9$ may be hydrogen or hydroxyl. Reaction of a steroid of formula XIV with ethylene glycol in the presence of an acid, e.g., p-toluenesulfonic acid gives an acetal having the structure:

(XV)

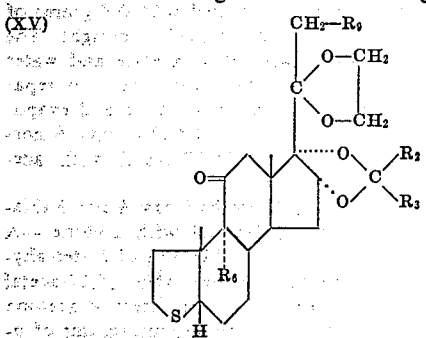

The steroid of formula XV may be treated with a reducing agent, e.g., lithium aluminium hydride, to obtain an 11β-hydroxy steroid having the structure:

(XVI)

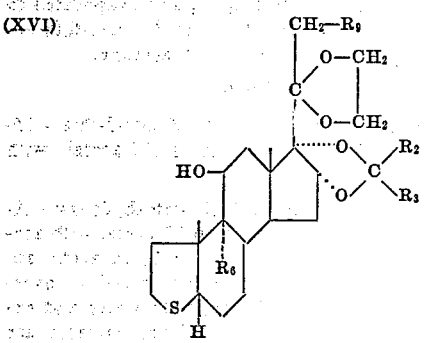

Removal of the acetal blocking group is accomplished by treating the steroid of formula XVI with acid to obtain a thia steroid having the structure:

(XVII)

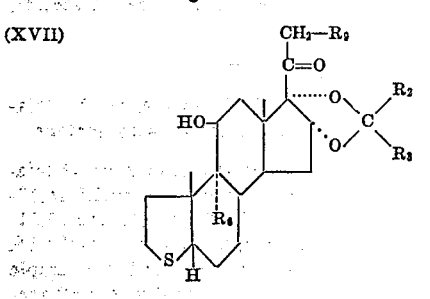

Steroids of Formula XVIII, wherein $R_9$ is hydroxyl, may be reacted with acetic anhydride (as described above) to obtain corresponding 21-acetoxy steroids, or with a sulfonyl chloride and an inorganic halide (as described above) to obtain corresponding 21-halo steroids.

The sulfones of the A-nor-3-thia steroids (formula II) are obtained by reacting the corresponding A-nor-3-thia steroids of formula I (obtained as described above) with a peracid, such as peracetic, perbenzoic, pertrifluoroacetic, or meta-chloroperbenzoic acid.

The following examples are illustrative of the invention.

EXAMPLE 1

16α,17-dihydroxy-A-nor-3-thia-5β-pregnan-20-one, cyclic, 16,17-acetal with acetone (a) 16α,17 - dihydroxy-5β-pregnane-3,20-dione, cyclic 16,17-acetal with acetone.—A solution of 15.0 grams of 16α,17-dihydroxypregn-4-ene-3,20-dione, cyclic 16,17-acetal with acetone in 500 milliliters of ethyl acetate containing 3.6 grams of 5% Pd/BaSO$_4$ is hydrogenated at room temperature for 4 hours. The catalyst is removed by filtration and the filtrate is evaporated to dryness. The residue is crystallized from methanol to give 11.4 g. of 16α,17-dihydroxy-5β-pregnane-3,20-dione, cyclic 16,17-acetal with acetone, melting point 180° C. to 182° C.

(b) 16α,17 - dihydroxy-3,4-seco-5β-pregnan-20-one-3,4-dioic acid, cyclic 16,17-acetal with acetone.—A solution of 10.0 grams of 16α,17-dihydroxy-5β-pregnane-3,20-dione, cyclic 16,17-acetal with acetone in 400 milliliters of acetic acid is stirred for 5 hours at ambient temperature with 10.0 grams of chromium trioxide. The dark green mixture is diluted with water to 2 liters and extracted with ethyl acetate. Drying and solvent removal gives a residue which is dissolved in 400 milliliters of 20% sodium carbonate solution, and the neutral material is extracted into ether. The aqueous solution is acidified with 2N hydrochloric acid to pH 1 at 0° C. and filtered. The resulting solid is dried in vacuo and then recrystallized from ethyl acetate-methanol to give 2.68 grams of 16α,17-dihydroxy-3,4 - seco-5β-pregnan-20-one-3,4-dioic acid, cyclic 16,17-acetal with acetone, melting point 313° C. to 315° C. dec.

Anal.—Calcd. for $C_{26}H_{40}O$: C, 67.21; H, 8.68. Found: C, 66.97; H, 8.57.

(c) 2,5ξ-dibromo - 16α,17 - dihydroxy-2,5-seco-3,4-bisnorpregnan-20-one, cyclic 16,17-acetal with acetone.—A slurry of 4.8 grams of 16α,17-dihydroxy-3,4-seco-5β-pregnan-20-one-3,4-dioic acid, cyclic 16,17-acetal with acetone in 250 milliliters of carbon tetrachloride is heated to reflux with stirring, and 4.0 grams of red mercuric oxide is added. The flask is wrapped with aluminum foil to exclude light, and a solution of 4.0 grams of bromine in 25 milliliters of carbon tetrachloride is added dropwise. After 4 hours the reaction mixture is cooled, filtered and the filtrate evaporated in vacuo. The residue is dissolved in chloroform, washed with water and dried. Solvent removal gives an oil (5.2 grams) which is filtered through silica gel with 1:1 hexane/chloroform to give 2,5ξ-dibromo-16α,17 - dihydroxy-2,5-seco-3,4-bisnorpregnan-20-one, cyclic 16,17-acetal with acetone.

(d) 16α,17 - dihydroxy-A-nor-3-thia-5β - pregnan-20-one, cyclic 16,17-acetal with acetone.—A solution of 26 grams of sodium sulfide nonahydrate in 250 milliliters of ethanol, is heated to reflux and a solution of 2.6 grams of 2,5α - dibromo-16α,17-dihydroxy-2,5-seco-3,4-bisnorpregnan-20-one, cyclic 16,17-acetal with acetone in 50 milliliters of ethanol is added dropwise under a blanket of nitrogen. The solution is refluxed overnight, the solvent is removed in vacuo and the residue dissolved in chloroform, washed with water, 2N hydrochloric acid solution, water, and then dried, Solvent removal gives 1.7 grams of oil which is filtered through silica gel with 1:1 hexane/chloroform to give 1.2 grams of fairly pure material which is recrystallized from methanol to give 646 milligrams of 16α,17-dihydroxy-A-nor-3-thia-5β-pregnan - 20 - one, cyclic 16,17-acetal with acetone, melting point 208° C. to 210° C.

Anal.—Calcd. for $C_{22}H_{34}O_3S$: C, 69.80; H, 9.05; S. 8.47. Found: C, 69.61; H, 8.81; S, 8.22.

EXAMPLE 2

16α,17 - dihydroxy-A-nor-3-thia-5β-pregnan-20-one, cyclic 16,17-acetal with acetone, 3,3-dioxide A solution of 378 milligrams of 16α,17-dihyrdoxy-A-nor-3-thia-5β-pregnan-20-one, cyclic 16,17-acetal with acetone and 600 milligrams of m-chloroperbenzoic acid in 10 milliliters of methylene chloride is stirred at 0° C. for 2 hours. The resulting slurry is diluted with chloroform, washed with 5% sodium bicarbonate solution, 10% sodium bisulfite solution and water, and dried over sodium sulfate. The solution is evaporated to dryness and the residue is crystallized from methanol yielding 212 milligrams of 16α,17-dihydroxy-A-nor-3-thia-5β-pregnan-20-one, cyclic 16,17-acetal with acetone, 3,3-dioxide, melting point 218° C. to 220° C. The analytical sample is prepared by recrystallization from methanol, melting point 238° C. to 240° C.

Anal.—Calcd. for $C_{22}H_{34}O_5S$: C, 64.36; H, 8.35; S, 7.81. Found: C, 64.64; H, 8.42; S, 7.55.

EXAMPLE 3

16α,17,21-trihydroxy-A-nor-3-thia-5β-pregnan-20-one, 21-acetate, cyclic 16,17-acetal with acetone 16α,17,21 - trihydroxy-A-nor-3-thia-5β-pregnan-20-one, cyclic 16,17-acetal with acetone is prepared from 16α-17, 21-trihydroxypregn-4-ene-3,20-dione, 21-acetate, cyclic 16,17-acetal with acetone following the procedure of Example 1.

A solution of 1.5 grams of 16α,17,21-trihydroxy-A-nor-3-thia-5β-pregnan-20-one, cyclic 16,17-acetal with acetone in 3 milliliters of acetic anhydride and 6 milliliters of pyridine is allowed to stand at 20° C. overnight. The reaction mixture is diluted with water and extracted with chloroform. The chloroform extracts are washed with a 5% HCl solution, saturated sodium bicarbonate solution, an 8% salt solution, and then dried with $Na_2SO_4$ and evaporated to give 16α,17,21-trihydroxy-A-nor-3-thia-5β-pregnan-20-one, 21-acetate, cyclic 16,17-acetal with actetone.

EXAMPLE 4

21 - chloro-16α,17-dihydroxy-A-nor-3-thia-5β-pregnan-20-one, cyclic 16,17-acetal with acetone (a) 16α,17,21 - trihydroxy-A-nor-3-thia-5β-pregnan-20-one, 21-methanesulfonate, cyclic 16,17-acetal with acetone.—16α,17,21 - trihydroxy - A - nor-3-thia-5β-pregnan-20-one, cyclic 16,17-acetal with acetone is prepared from 16α,17,21 - trihydroxypregn - 4-ene-3,20-dione, 21-acetate, cyclic 16,17-acetal with acetone following the procedure of Example 1.

A solution of 1.2 grams of 16α,17,21-trihydroxy-A-nor-3-thia-5β-pregnan-20-one, cyclic 16,17-acetal with acetone in 5 milliliters of pyridine is cooled to 0° C. and treated with 0.35 milliliters of methanesulfonyl chloride. The solution is left at this temperature for 3 hours. The solution is then poured into ice water and extracted with chloroform. The chloroform extracts are washed with 2N HCl solution, 8% salt solution, and then dried with $Na_2SO_4$ and evaporated to give 16α,17,21-trihydroxy-A-nor-3-thia-5β-pregnan-20-one, 21-methanesulfonate, cyclic 16,17-acetal with acetone.

(b) 21 - chloro-16α,17-dihydroxy-A-nor-3-thia-5β-pregnan-20-one, cyclic 16,17-acetal with acetone.—A solution of 0.9 grams of 16α,17,21trihydroxy-A-nor-3-thia-5β-pregnan-20-one, 21-methanesulfonate, cyclic 16,17-acetal with acetone in 40 milliliters of dimethylformamide containing 0.8 grams of lithium chloride is refluxed for 1 hour. The reaction mixture is poured into water and extracted with ethyl acetate. The ethyl acetate extracts are washed with 8% salt solution and then dried with $Na_2SO_4$ and evaporated to give 21-chloro-16α,17-dihydroxy-A-nor-3-thia-5β-pregnan-20-one, cyclic 16,17-acetal with acetone.

EXAMPLE 5

9-fluoro-11β,16α,17,21-tetrahydroxy-A-nor-3-thia-5β-pregnan-20-one, cyclic 16,17-acetal with acetone (a) 9 - fluoro - 16α,17,21-trihydroxy-A-nor-3-thia-5β-pregnane-11,20-dione, cyclic 16,17-acetal with acetone, 20-ethylene ketal.—9 - fluoro - 16α,17,21-trihydroxy-A-nor-3-thia-5β-pregnane-11,20-dione, cyclic 16,17-acetal with acetone is prepared from 9-fluoro-11β,16α,17,21-tetrahydroxypregn-4-ene-3,20-dione, 21-acetate, cyclic 16,17-acetal with acetone following the procedure of Example 1.

A solution of 865 milligrams of 9-fluoro-16α,17,21-trihydroxy-A-nor-3-thia-5β-pregnane-11,20-dione, cyclic 16, 17-acetal with acetone in 20 milliliters of benzene and 1.5 milliliters of ethylene glycol containing 115 milligrams of p-toluenesulfonic acid is refluxed in a modified Dean-Stark apparatus for 23 hours. The reaction mixture is washed with 8% salt solution, dried with $Na_2SO_4$ and evaporated to give 9 - fluoro - 16α,17,21-trihydroxy-A-nor-3-thia-5β-pregnane-11,20-dione, cyclic 16,17acetal with acetone, 20-ethylene ketal.

(b) 9 - fluoro-11β,16α,17,21-tetrahydroxy-A-nor-3-thia-5β-pregnan-20-one, cyclic 16,17-acetal with acetone, 20-ethylene ketal.—A solution of 2.1 grams of 9-fluoro-16α, 17,21 - trihydroxy-A-nor-3-thia-5β-pregnane-11,20-dione, cyclic 16,17-acetal with acetone, 20-ethylene ketal in 45 milliliters of tetrahydrofuran is treated with 0.8 grams of lithium aluminum hydride and refluxed overnight. The reaction mixture is treated with ethyl acetate and water and diluted with chloroform. The organic layer is separated, washed with an 8% salt solution, dried and evaporated to give 9-fluoro-11β,16α,17,21-tetrahydroxy-A-nor-3-thia-5β-pregnan-20-one, cyclic 16,17-acetal with acetone, 20-ethylene ketal.

(c) 9 - fluoro-11β,16α,17,21-tetrahydroxy-A-nor-3-thia-5β-pregnan-20-one, cyclic 16,17-acetal with acetone.—A solution of 3.6 grams of 9-fluoro-11β,16α,17,21-tetrahydroxy-A-nor-3-thia-5β-pregnan-20-one, cyclic 16,17-acetal with acetone, 20-ethylene ketal in 75 milliliters of acetone and 3 milliliters of water containing 440 milligrams of p-toluenesulfonic acid is refluxed for 22 hours. The reaction mixture is concentrated, diluted with water and extracted with chloroform. The chloroform extracts are washed with an 8% salt solution, dried with $Na_2SO_4$ and evaporated to give 9-fluoro-11β,16α,17,21-tetrahydroxy-A-nor-3-thia-5β-pregnan-20-one, cyclic 16,17-acetal with acetone.

EXAMPLE 6

9-fluoro-11β,16a,17,21 - tetrahydroxy - A-nor-3-thia - 5β-pregnan-20-one, 21-acetate, cyclic 16,17-acetal with acetone A solution of 9-fluoro-11β,16α,17,21-tetrahydroxy - A-nor-3-thia-5β-pregnan-20-one, cyclic 16,17-acetal with acetone (prepared as described in Example 5) in acetic anhydride and pyridine is allowed to stand at 20° C. overnight. The reaction mixture is diluted with water and extracted with chloroform. The chloroform extracts are washed with a 5% HCl solution, saturated sodium bicarbonate solution, an 8% salt solution, and then dried with $Na_2SO_4$ and evaporated to give 9-fluoro-11β,16a,17,21-tetrahydroxy-A-nor-3-thia-5β-pregnan-20 - one, 21-acetate, cyclic 16,17-acetal with acetone.

EXAMPLE 7

21-chloro-9-fluoro-11β,16a,17-trihydroxy - A-nor-3 - thia-5β-pregnan-20-one, cyclic 16,17-acetal with acetone (a) 9-fluoro-11β,16a,17,21 - tetrahydroxy-A-nor-3-thia-5β - pregnan-20-one, 21 - methanesulfonate, cyclic 16,17-acetal with acetone.—A solution of 9-fluoro-11β,16a,17,21-tetrahydroxy-A-nor-3-thia-5β - pregnan-20 - one, cyclic 16, 17-acetal with acetone (prepared as described in Example 5) in pyridine is cooled to 0° C. and treated with methanesulfonyl chloride. The solution is left at this temperature for 3 hours. The solution is then poured into ice water and extracted with chloroform. The chloroform extracts are washed with 2N HCl solution, 8% salt solution, and then dried with $Na_2SO_4$ and evaporated to give 9-fluoro-11β, 16a,17,21-tetrahydroxy-A-nor-3-thia-5β - pregnan-20-one, 21-methansulfonate, cyclic 16,17-acetal with acetone.

(b) 21-chloro-9-fluoro-11β,16a,17 - trihydroxy - A-nor-3-thia-5β - pregnan - 20-one, cyclic 16,17-acetal with acetone.—A solution of 9-fluoro-11β,16a,17,21-tetrahydroxy-A-nor-3-thia-5β - pregnan-20-one, 21 - methanesulfonate, cyclic 16,17-acetal with acetone in dimethylformamide containing lithium chloride is refluxed for 1 hour. The reaction mixture is poured into water and extracted with ethyl acetate. The ethyl acetate extracts are washed with 8% salt solution, and then dried with $Na_2SO_4$ and evaporated to give 21-chloro-9-fluoro-11β,16α,17-trihydroxy-A-nor - 3-thia - 5β - pregnan-20-one, cyclic 16,17-acetal with acetone.

What is claimed is:

1. A compound having the structure selected from the group consisting of

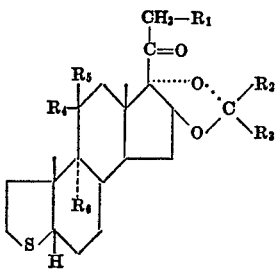

and

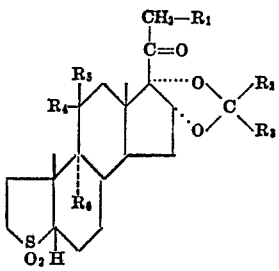

wherein $R_1$ is selected from the group consisting of hydrogen, hydroxy, acetoxy, and halo; $R_2$ is selected from the group consisting of hydrogen, lower alkyl and aryl; $R_3$ is selected from the group consisting of lower alkyl and aryl; $R_4$ is selected from the group consisting of hydrogen, and hydroxy, and $R_5$ is hydrogen, or $R_4$ and $R_5$ are together keto; and $R_6$ is selected from the group consisting of hydrogen and halo wherein aryl is phenyl or phenyl substituted by halo, lower alkoxy, or lower alkyl.

2. A compound in accordance with Claim 1 having the structure:

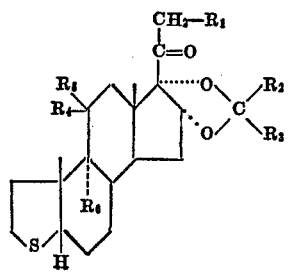

3. A compound in accordance with Claim 1 having the structure:

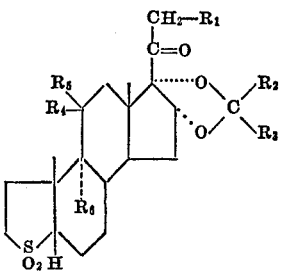

4. A compound in accordance with Claim 1 wherein $R_1$ is hydrogen.

5. A compound in accordance with Claim 1 wherein $R_1$ is hydroxy.

6. A compound in accordance with Claim 1 wherein $R_1$ is acetoxy.

7. A compound in accordance with Claim 1 wherein $R_1$ is halo.

8. A compound in accordance with Claim 1 wherein $R_4$ and $R_5$ are hydrogen.

9. A compound in accordance with Claim 1 wherein $R_4$ is hydroxy and $R_5$ is hydrogen.

10. A compound in accordance with Claim 1 wherein $R_4$ and $R_5$ together are keto.

11. A compound in accordance with Claim 1 wherein $R_6$ is fluoro.

12. A compound in accordance with Claim 2 having the name 16α,17-dihydroxy-A-nor-3-thia-5β-pregnan - 20-one, cyclic 16,17-acetal with acetone.

13. A compound in accordance with Claim 3 having the name 16α,17-di-hydroxy-A-nor-3-thia-5β-pregnan-20-one, cyclic 16,17-acetal with acetone, 3,3-dioxide.

14. A compound in accordance with Claim 2 having the name 16α,17,21-trihydroxy-A-nor-3-thia-5β-pregnan-20-one, 21-acetate, cyclic 16,17-acetal with acetone.

15. A compound in accordance with Claim 2 having the name 21 - chloro - 16α,17 - dihydroxy-A-nor-3-thia-5β-pregnan-20-one, cyclic 16,17-acetal with acetone.

16. A compound in accordance with Claim 2 having the name 9-fluoro - 11β,16α,17,21 - tetrahydroxy-A-nor-3-thia-5β-pregnan-20-one, cyclic 16,17-acetal with acetone.

17. A compound in accordance with Claim 2 having the name 9-fluoro-11β,16α,17,21-tetrahydroxy - A-nor-3-thia-5β-pregnan-20-one, 21-acetate, cyclic 16,17-acetal with acetone.

18. A compound in accordance with Claim 2 having the name 21 - chloro-9-fluoro-11β,16α,17-trihydroxy-A-nor-3-thia-5β-pregnan-20-one, cyclic 16,17-acetal with acetone.

References Cited

UNITED STATES PATENTS 3,420,855    1/1969    Levine _____ 260—346.2

NATALIE TROUSOF, Primary Examiner

C. M. S. JAISLE, Assistant Examiner

U.S. Cl. X.R.

424—275

UNITED STATES PATENT OFFICE
CERTIFICATE OF CORRECTION

Patent No. 3,825,566      Dated July 23, 1974

Inventor(s) Christopher M. Cimarusti, Frederick F. Giarrusso, and Seymour D. Levine It is certified that error appears in the above-identified patent and that said Letters Patent are hereby corrected as shown below:

Column 4, line 1, the word "actic" should be: -- acetic --.

Column 5, line 65, "Formula XVIII" should be: -- Formula XVII --.

Column 6, line 73, the word "dihyrdoxy" should be: -- dihydroxy --.

Column 9, Claim 1, lines 12 through 24, the formula should be:

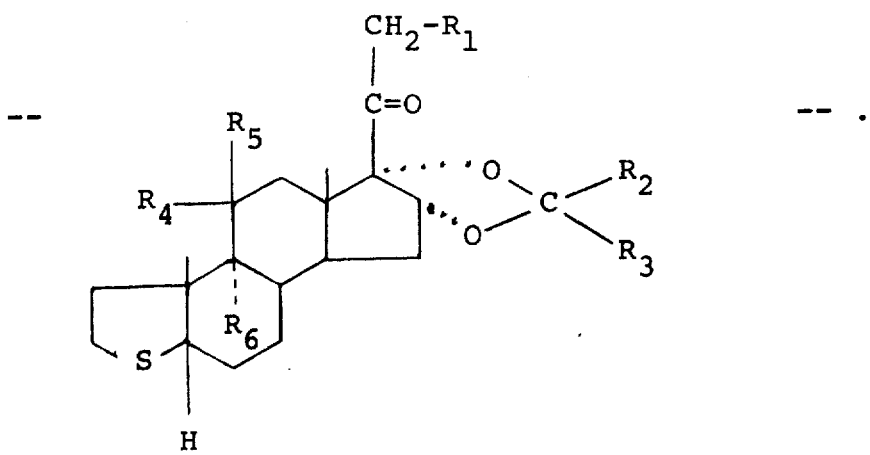

Signed and sealed this 15th day of October 1974.

(SEAL)
Attest;

McCOY M. GIBSON JR.
Attesting Officer

C. MARSHALL DANN
Commissioner of Patents